C. W. KOEHLER.
SMOKEHOUSE.
APPLICATION FILED NOV. 19, 1919.

1,398,726.

Patented Nov. 29, 1921.
4 SHEETS—SHEET 3.

WITNESS:
R. L. Treist

INVENTOR.
CARL W. KOEHLER
BY
ATTORNEYS

C. W. KOEHLER.
SMOKEHOUSE.
APPLICATION FILED NOV. 19, 1919.
1,398,726.
Patented Nov. 29, 1921.
4 SHEETS—SHEET 4.
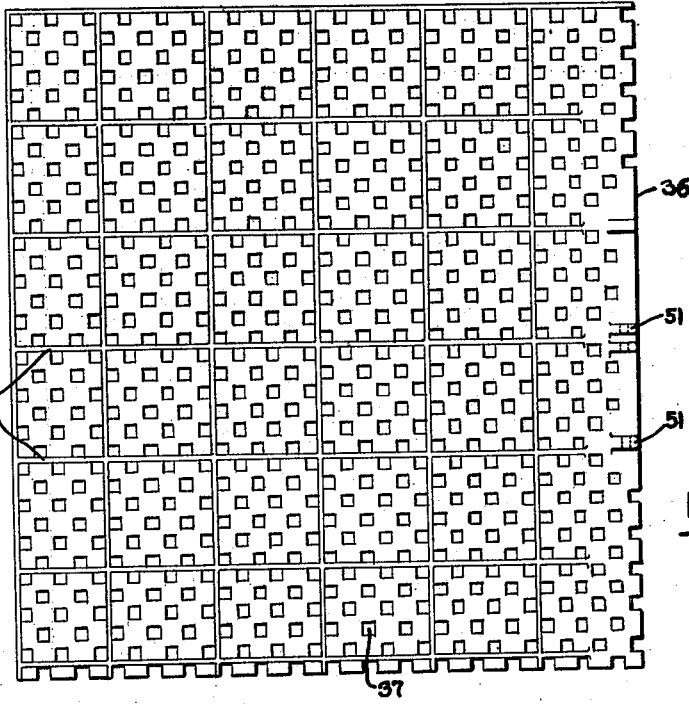
FIG-4-
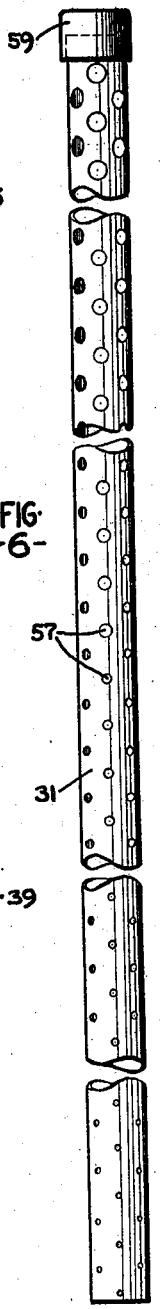
FIG-6-
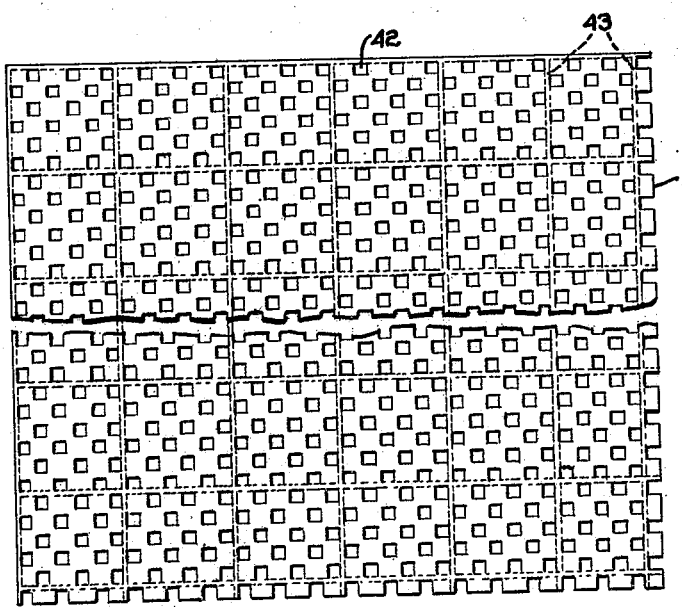
FIG-5-
WITNESS:
INVENTOR
CARL W. KOEHLER
BY
ATTORNEYS

UNITED STATES PATENT OFFICE.

CARL W. KOEHLER, OF CHICAGO, ILLINOIS, ASSIGNOR TO BOOTH FISHERIES COMPANY, OF CHICAGO, ILLINOIS, A CORPORATION OF DELAWARE.

SMOKEHOUSE.

1,398,726.  Specification of Letters Patent.  Patented Nov. 29, 1921.

Application filed November 19, 1919. Serial No. 339,164.

*To all whom it may concern:*

Be it known that I, CARL W. KOEHLER, a citizen of the United States, residing at Chicago, in the county of Cook and State of Illinois, have invented a certain new and useful Smokehouse, of which the following is a specification.

The invention relates to a novel construction of smoke house particularly adapted for the smoking of fish, meats and kindred products.

Primarily, the invention seeks to provide an improved form of smoke house designed to be fired by gas, and having provision for producing the necessary smoke through the treatment of sawdust appropriately subjected to the heat generated by the gas, and for obtaining uniform distribution of the smoke.

A further object of the invention is to incorporate in a smoke house of the type mentioned novel and efficient means for controlling both the temperature and volume of the smoke as may be required for the particular product to be treated.

Furthermore, the invention also has in contemplation provision of means for equalizing the draft within and throughout the smoke house to accord with variations in the atmospheric conditions arising at the stack to which the main discharge of the products of combustion is connected.

A further object of the invention is so to organize and relate the structural elements embodied in the smoke house as to adapt the same to wide range of flexibility for meeting the varying conditions arising in the treatment of diversified products; to enable the latter to be cooked, as well as smoked, and to avoid absorption by the products under treatment of gases or odors affecting the flavor or taste thereof.

Other objects and advantages will appear as the nature of the improvements is better understood, the invention consisting substantially in the novel construction, combination and arrangement of parts hereinafter fully described, illustrated in the accompanying drawings, and finally pointed out in the appended claims.

The invention may be embodied in various specific forms, one of which is made the basis of the present disclosure, thereby delineating a practical embodiment which the invention may assume, but this disclosure is to be considered only from an illustrative standpoint and is not to be taken in a restrictive or limiting sense.

In the drawings:

Figs. 4 and 5 are similar views of the smoke controlling valve and the seat therefor, respectively.

Fig. 6 is a top plan view, on an enlarged scale, of one of the air pipes.

Figure 1:
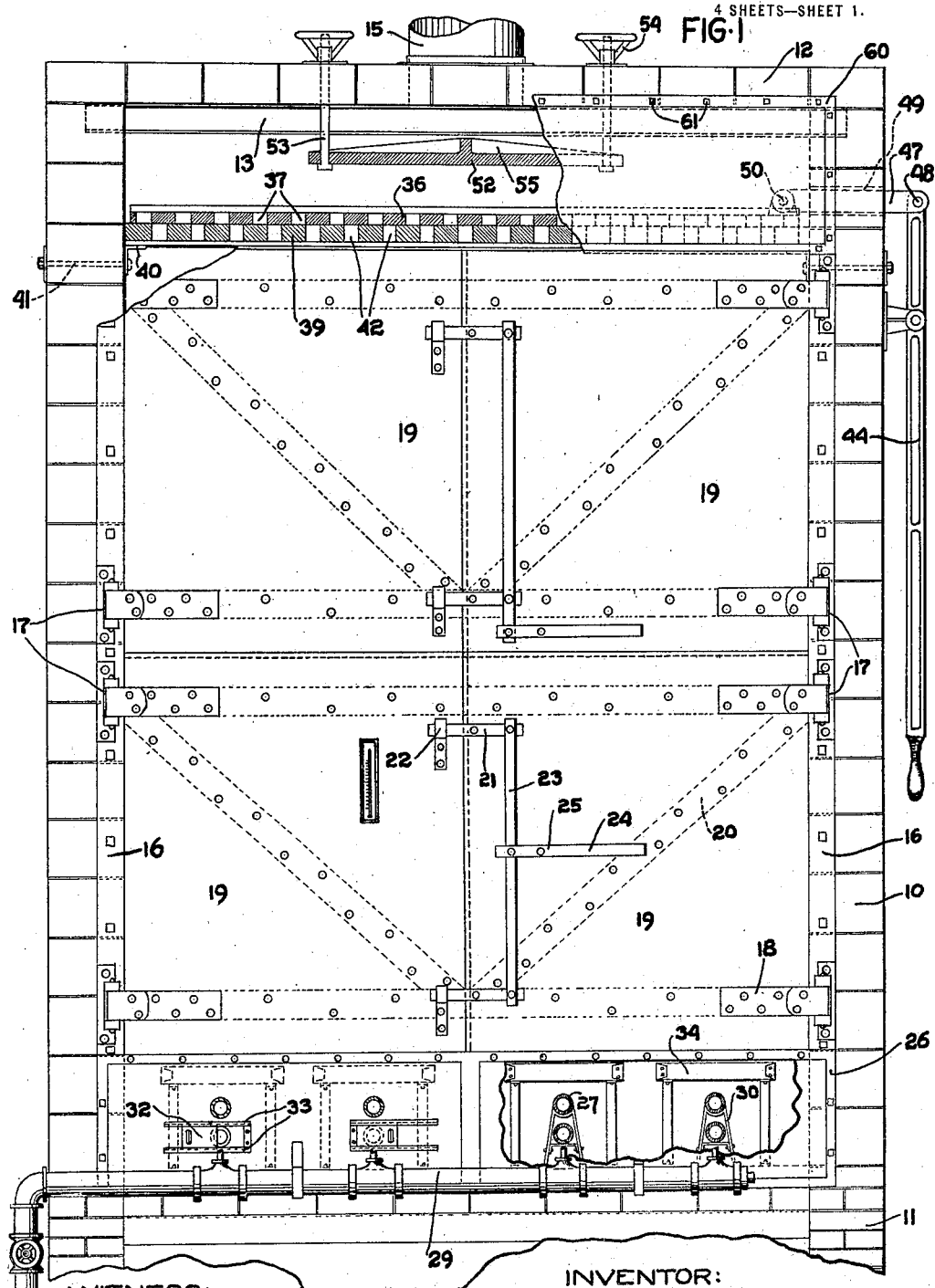
Figure 1 is a front elevation, partially in section, of a smoke house constructed in accordance with the present invention.
Figure 2:
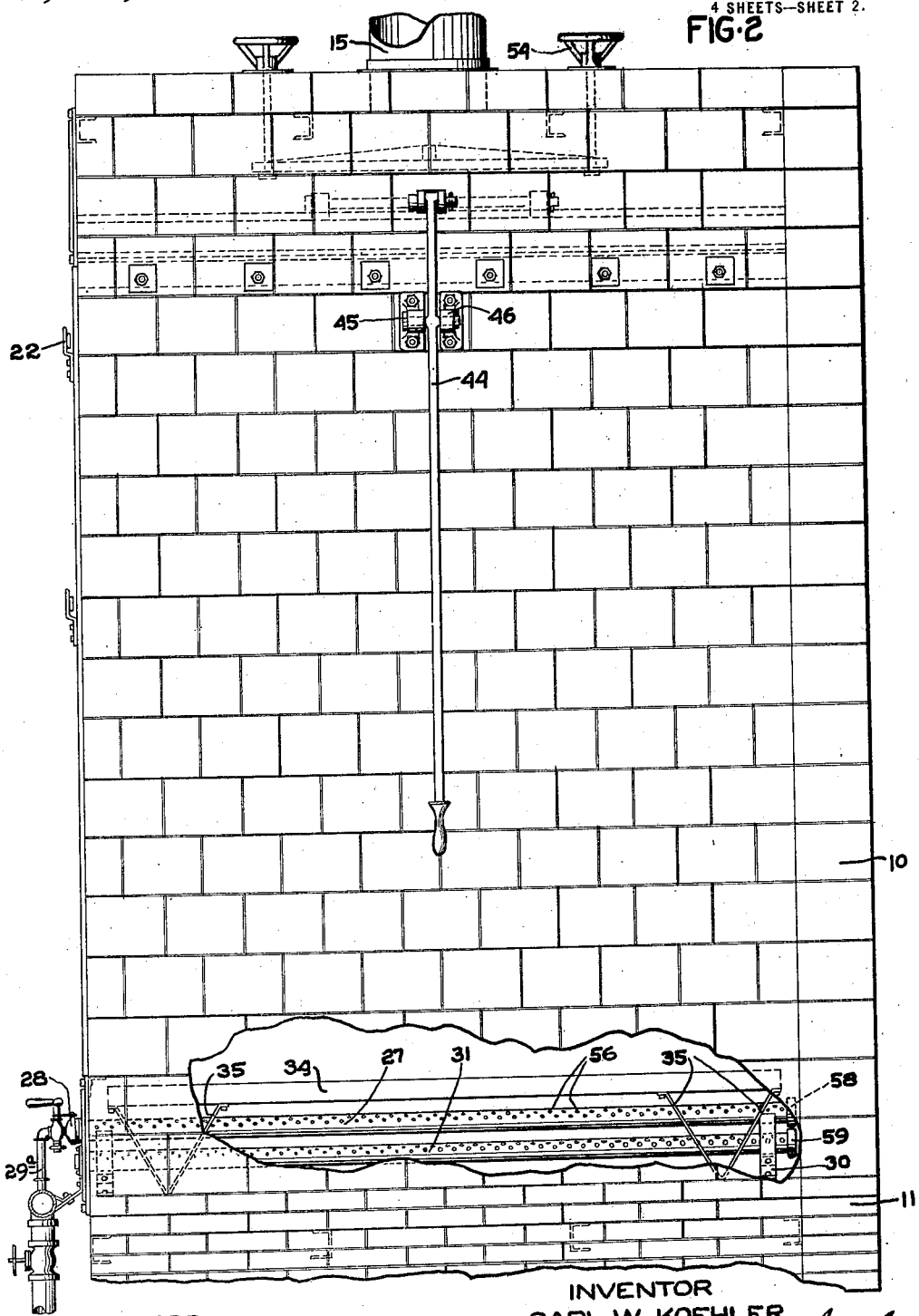
Fig. 2 is a side elevation thereof, a portion being broken away to disclose more clearly the relative arrangement of the firing elements.
Figure 3:
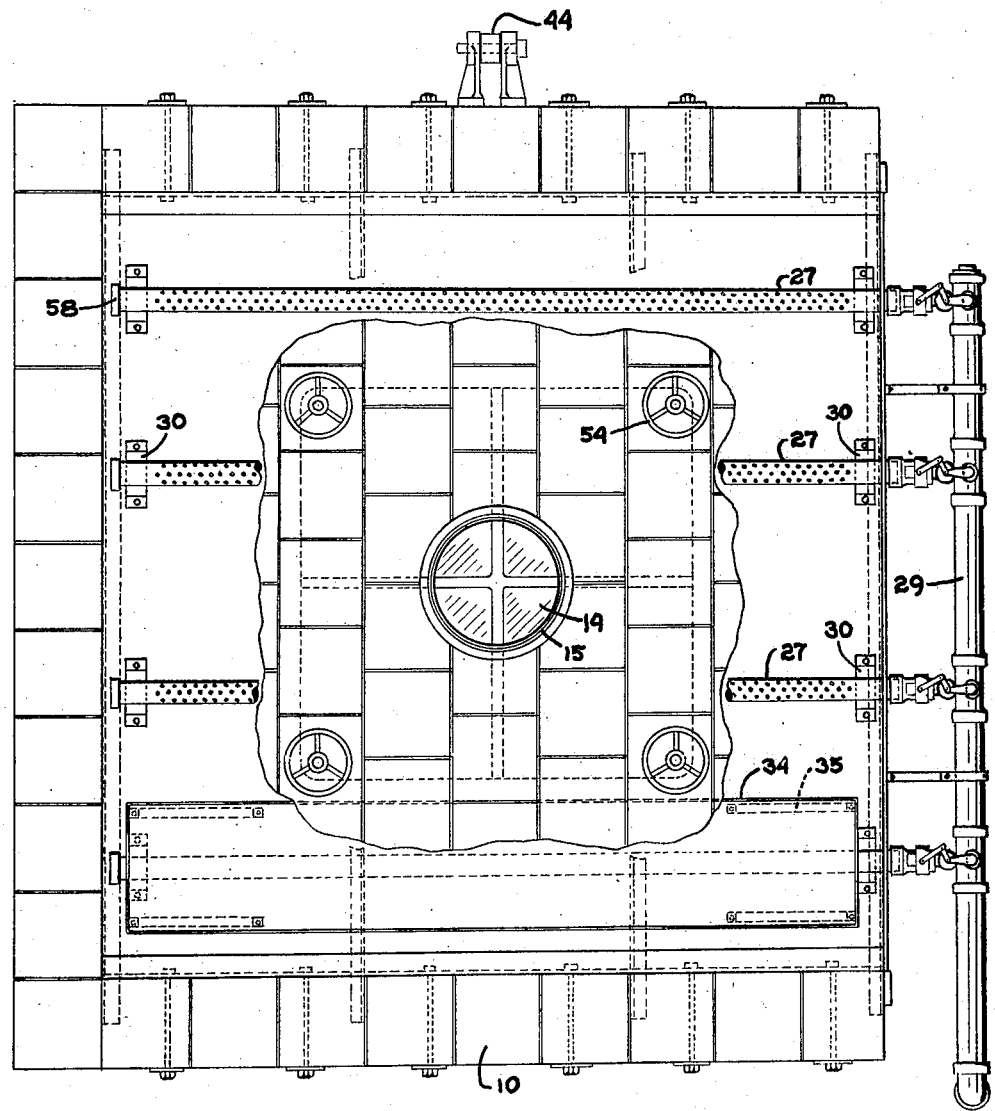
Fig. 3 is a top plan view, also partially broken away.

Referring in detail to the accompanying drawings, the numeral 10 designates the housing of the herein described structure. This is preferably formed of interlocking tiles, the same being substantially rectangular in form, and being supported upon a proper foundation 11, which is preferably constituted of standard fire brick. The top 12 of the housing 10 is also formed of tile, the same being supported on a plurality of channel bars 13 which extend across the interior of the upper portion of the housing 10, their ends finding lodgment in the upper portions of said side walls. This top has formed therein an exhaust opening 14 to which a stack 15 is appropriately connected for the discharge of the products of combustion.

The face portions of the side walls of the housing 10 are each provided with anchoring strips 16, these strips being of suitable dimension, and preferably of steel, the same extending from the foundation 11 to the top 12. Each of these anchoring strips 16 carries a plurality of hinge brackets 17, to each of which is connected a strap hinge 18. The hinges 18 are designed to support a series of doors 19, four of which are employed, these doors being formed preferably of sheet metal, and of sufficient dimension to close the front of the housing 10, with the exception of the top and bottom portions thereof. The doors 19 are designed to overlap, the lower doors overlapping at their upper edges the lower edges of the upper doors, and the inner edge of the lower right hand door being adapted to overlap the inner edge of the lower left hand door. This overlapping relation of the doors 19 provides smokeproof joints so that the smoke generated within the housing 10 is precluded escaping at the joints. Each door is provided with a reinforcing strip 20, which extends diagonally across the same, said strips being riveted or otherwise suitably connected to their respective doors, and thereby guarding against warpage of the doors due to the heat within the housing. Each pair of the doors 19 is designed to be held in closed relation with respect to each other by means of pivoted latches 21 carried by one of the doors and extending across the joint therebetween, said latches engaging at their free ends with keepers 22 carried by the other door of the pair. The latches 21 of each pair of doors are connected by an operating bar 23 to which one end of an actuating lever 24 is pivotally connected, said lever 24 being pivoted, as at 25, to the door 19 with which it is associated. The latches 21, therefore, provide effectual means for holding the doors in closed relation to each other and in closed relation to the housing 10 for preventing egress of the smoke therefrom.

Extending from the lower pair of the doors 19 to the foundation 11, and covering the space thereat, is a closure plate 26. This plate is appropriately formed with a series of openings arranged in pairs, the upper opening of each pair having fitted therein a gas burner 27 in the form of an elongated pipe which extends from the front of the housing approximately to the rear wall thereof. The forward ends of the burners 27 project beyond the plate 26, at which point there is connected to each of the same a proper gas mixing valve 28. Preferably these mixing valves are of the Hale type. A feed pipe 29, which extends across the front of the housing 10 and is connected to a gas main at any suitable point, conveys the gas to the burners 27, each of the latter being connected with the feed pipe 29 by branch feed pipes 29ª. Each burner 27 is supported within the housing 10 by a plurality of brackets 30, which may be conveniently formed of strap sheet metal, the brackets 30 holding the burners 27 at a proper height above the bottom of the housing 10 for accommodating a plurality of air feeding tubes 31. One of these air feeding tubes is arranged directly beneath each of the burners 27, the forward end of each of said tubes 31 projecting through the closure plate 27, and associated with the forward end of each of said air tubes 31 is a valve plate 32 mounted in a pair of guides 33 arranged in such relation to each of the tubes 31 that the feed of air into said tubes may be readily controlled. Obviously, if the valve plates 32 are moved to such position as to cover the ends of the tubes 31, the flow of air to the latter will be entirely cut off, while a proper proportional movement of the valve plates will regulate the amount of flow of the air to said tubes.

For producing the required smoke for the treatment of the products within the housing 10 a sawdust pan 34 is arranged immediately over each of the gas burners 27. These pans are formed preferably of sheet metal appropriately riveted at their joints and reinforced at their edges to prevent buckling under the heat. They are provided with a series of V-shaped supporting members 35 designed to rest upon the bottom of the smoke house, and of such length that the pans will be held in elevated relation to the burners 27 that the flame and heat therefrom will properly heat the pans.

In order to control the smoke, both as to its temperature and intensity, a valve 36 is employed. This valve is of rectangular form, as illustrated in Fig. 4, and is provided with a multiplicity of openings 37 arranged in staggered relation and distributed in spaced relation throughout the area of said valve. The latter is of such size as to cover approximately the entire area between the walls of the housing 10. That the valve 36 may be prevented from warping the same has formed at its upper face a plurality of intersecting ribs 38 which extend crosswise thereof. The valve 36 is supported by a seat 39, which, in turn, is supported by a series of angle bars 40 bolted to the walls of the housing 10, as at 41, thereby sustaining the seat 39 in proper relation to said walls. The seat 39 is also provided with a multiplicity of openings 42 which are arranged in staggered relation and distributed in spaced relation throughout the area of said seat. The opposing faces of the valve 36 and its seat 39 are finished in such manner as to permit free sliding movement of the valve over the seat, and in their normal relation the openings 37 of the valve do not register with the openings 42 of the seat. Such registry is effected only for permitting passage of the smoke in the manner hereinafter set forth. The under side of the seat 39 is also provided with a series of intersecting ribs 43 to strengthen the same and prevent its warping under the heat conditions.

To effect registry of the openings 37 and 42 an operating lever 44 is located at the exterior of the housing 10, the same being mounted on a pivot pin 45 carried by a pair of supporting lugs 46. The lower end of the operating lever 44 is conveniently accessible for manipulation, while the upper end thereof is pivotally connected to a link 47, as at 48, which link extends through an opening 49 formed in the housing 10. The inner end of the link 47 is connected to a pin 50 supported by a plurality of lugs 51 carried by the valve 36. Therefore, upon proper actuation of the lever 44 the valve 36 is caused to slide over the seat 39, and its degree of movement will proportionally open or close the openings 37 and 42, and thereby control the area of said openings for passage of the smoke therethrough.

That a uniform flow of the smoke in an upward direction through the housing 10 may be effected and insured, a deflector plate 52 is interposed between the top 12 of the housing and the smoke control valve 36. This deflector plate is arranged beneath the stack 15 so that a direct draft to the stack is intercepted, and said plate 52 is suspended on the heads of a series of adjusting bolts 53, the upper threaded ends of which project through the top 12 of the housing, at which point a regulating wheel 54 is connected to the threaded ends of said bolts. By proper adjustment of the several wheels 54 the deflector plate 52 may be raised or lowered, thereby varying the space between the same and the housing 12, and thus establishing uniform flow of the smoke about said plate. To prevent warpage of the plate 52 the same is provided with strengthening ribs 55.

The burner tubes 27 have discharge openings 56 arranged in staggered relation, and these openings may be of uniform size throughout the length of said tubes. The pressure of the gas introduced to the tubes insures proper flow of the gas through said openings. Inasmuch, however, as atmospheric air only passes into the air feeding tubes 31, and is therefore not under pressure, uniform size of the openings 57 of said air tubes 31 would preclude a uniform distribution and feed of the air through said tubes and into the housing 10. To establish such uniformity of flow and distribution the openings 57 of the air tubes 31 vary in size, progressively increasing in zones from the front end of said tubes 31 to the rear ends thereof, as is clearly illustrated in Fig. 6, the smaller size of the openings 57 being located adjacent to the inlet ends of the tubes, while the larger openings extend therefrom to the rear ends thereof. The rear ends of both the burners 27 and the air tubes 31 are closed by caps 58 and 59, respectively.

In the operation of the herein described smoke house, it is assumed that the interior thereof has been provided with the products to be treated, which are suitably supported in the space between the valve support 42 and the pans 34, or if it be desired initially to fire the house before introduction of the products, this may be done. The controlling valves 28 being properly manipulated for introduction of gas to the burners, the gas is lighted, and the temperature of the pans 34 thereby becomes raised to the required temperature. Sawdust is then thrown into the pans, the sawdust of hard wood, and particularly hickory, preferably being employed. Smoke is thereby generated, and the same rises through the chamber, being absorbed to some degree by the products therein. Obviously, if the openings 42 be closed or restricted, the smoke will accumulate within the housing beneath the smoke controlling valve. To regulate the density to which the smoke may accumulate in the chamber the operating lever 44 is properly manipulated to adjust the effective area of the openings 42, which will determine the rate of flow which the smoke shall take in its passage upwardly through the housing. This will be controlled, of course, by the knowledge of the operator with respect to the length of time and the degree of permeation to which the products are to be subjected. Atmospheric conditions at the stack 15 will vary from time to time, and thereby vary the flow of the smoke through the house. To control this deflector plate 52 is adjusted relatively to the top 12 and the stack 15, thereby varying the space between the deflector and the stack, and thus regulating the volume of smoke that will pass into the stack.

The natural draft induces admission of fresh air to the inlet tubes 31 and circulation of the air thereby into the housing 10. By the admission of atmospheric air, complete combustion is assured, as well as a proper mixture of the air and smoke for treatment of the products within the housing, and the introduction of said air is controlled by proper adjustment of the slides 32 at the inlet portions of the tubes 31. These results are obtained by the disposal of the inlet tubes in such relationship that they discharge air about the burners, thus affording the necessary secondary air for combustion, and also effecting the heating of the air, which then rises through the intervening spaces between the pans, being thus uniformly distributed throughout the area of the chamber, and commingled with the smoke in all parts thereof. The fact that the portion of the chamber in which the burners 27 are mounted, and in which the combustion takes places, is segregated from the higher portions of the chamber by the form and relationship of the pans, the heating of the air to the proper temperature and the generation of the desired smoke are accomplished without subjecting the contents of the chamber to the fire or excessive direct heat therefrom. The velocity of flow and the quantity of the air admitted are controlled by the valve 36, and proper operation of the latter also controls the intensity of the smoke, as well as enabling the heat to be increased or decreased as may be required for proper smoking of the particular product under treatment.

The herein described smoke house may be used for cooking purposes at the same time that the product therein is being smoked. This is particularly applicable to fish, meats and kindred products, and fruits may be cured and dried, the natural taste and flavor being maintained. Furthermore, the absorption of any gases or odors by the product within the smoke house is prevented by the thorough mixture of air and gas in the burners and the resultant perfect combustion, and the smoke serving to neutralize any acids in the products leaves the latter with a delicate taste and flavor.

To close the upper portion of the housing 12, between the upper pair of doors 19 and the top 12, a closure plate 60 is employed. This is removably attached to the housing by bolts 61 of appropriate form, so that access may be had readily to the space occupied by the smoke controlling valve 36, its seat 39, and the deflector plate 52.

I claim:

1. In a smoke house, the combination with a housing, of a gas burner arranged therein, a pan arranged above said burner for receiving sawdust for the production of smoke when said pan is heated by said burner, means for controlling passage of the smoke through the housing, and means for varying the tensity and temperature of the smoke.

2. In a smoke house, the combination with a housing, of a gas burner arranged in the lower portion thereof, a pan arranged above said burner for receiving sawdust for the production of smoke when said pan is heated by said burner, and means at the upper portion of the housing and operable exteriorly thereof for controlling passage of the smoke through the housing.

3. In a smoke house, the combination with a housing affording a chamber, of a gas burner arranged in the lower portion thereof, a pan arranged above said burner for receiving sawdust for the production of smoke when said pan is heated by said burner, and valve mechanism at the upper portion of the chamber for equalizing the flow and controlling the passage of smoke through the housing.

4. In a smoke house, the combination with a housing, of means arranged therein for producing smoke, and valve mechanism at the upper portion of the housing for intercepting and distributing the flow of the smoke through the housing, said valve mechanism being adjustable to vary its efficacy while the smoking operation is in progress.

5. In a smoke house, the combination with a housing, of a gas burner arranged therein and extending across the lower portion thereof, a pan arranged above said burner and also extending across the lower portion of the housing, said pan being adapted to receive sawdust for the production of smoke when said pan is heated by said burner, and means associated with said burner for discharging air thereabout within the housing for mixture with the smoke.

6. In a smoke house, the combination with a housing, of a gas burner arranged therein and extending across the lower portion thereof, said burner having jet apertures, a pan arranged above said burner and also extending across the lower portion of the housing, said pan being adapted to receive sawdust for the production of smoke when said pan is heated by said burner, and means arranged beneath said burner for discharging air to the apertures.

7. In a smoke house, the combination with a housing, of a gas burner arranged therein and extending across the lower portion thereof, a pan arranged above said burner and also extending across the lower portion of the housing, said pan being adapted to receive sawdust for the production of smoke when said pan is heated by said burner, an air tube arranged beneath said burner, and communicating with the atmosphere for admitting air to the housing for mixture with the smoke, and means for controlling the admission of atmospheric air to said air tube.

8. In a smoke house, the combination with a housing, of a gas burner arranged therein and extending across the same, a pan arranged above said burner and also extending across the housing, said pan being adapted to receive sawdust for the production of smoke when said pan is heated by said burner, and an air tube arranged beneath said burner and communicating with the atmosphere for admitting air to the housing for mixture with the smoke, said air tube being provided with discharge openings arranged in increasing diameters from the inlet thereof.

9. In a smoke house, the combination with a housing, of a gas burner arranged therein and extending across the same, a pan arranged above said burner and also extending across the housing, said pan being adapted to receive sawdust for the production of smoke when said pan is heated by said burner, an air tube arranged beneath said burner and communicating with the atmosphere for admitting air to the housing for mixture with the smoke, said air tube being provided with discharge openings arranged in increasing diameters from the inlet thereof, and means for controlling the admission of air to said air tube.

10. In a smoke house, the combination with a housing, of means for producing smoke, and controlling means for the passage of smoke through said housing, including a valve, a seat therefor, said valve and seat being provided with distributed openings, and means for causing relative movement of the valve with respect to said seat for varying the rate of flow of smoke through the housing.

11. In a smoke house, the combination with a housing, of means for producing smoke, and controlling means for the passage of smoke through said housing, including a valve, a seat therefor, said valve and seat being provided with distributed openings arranged in staggered relation and normally out of register, and means for causing relative movement of the valve and said seat for varying the rate of flow of smoke through the housing.

12. In a smoke house, the combination with a housing, of means for producing smoke, and controlling means for the passage of smoke through said housing, including a valve, a seat therefor, said valve and seat being provided with openings, an operating lever pivotally connected at the exterior of said housing for causing relative movement of the valve and said seat for controlling communication between the openings of the valve and seat, and an operative connection between said lever and said seat.

13. In a smoke house, the combination with a housing, of means for producing smoke, said housing being provided with a draft inducing outlet for the smoke, means for controlling passage of the smoke through the housing, and means interposed between said controlling means and said outlet for regulating flow of the smoke.

14. In a smoke house, the combination with a housing, of means for producing smoke, said housing being provided with a draft inducing outlet for the smoke, means for controlling passage of the smoke through the housing, means interposed between said controlling means and said outlet for regulating flow of the smoke, and means for adjusting said regulating means.

15. In a smoke house, the combination with a housing, of means for producing smoke, said housing being provided with an outlet for the smoke, means for distributing smoke in passage through the housing, a deflector interposed between the distributing means and said outlet and extending over the latter for regulating flow of the smoke, and means for adjusting said deflector.

16. In a smoke house, the combination with a housing, of means for producing smoke, said housing being provided with an outlet for the smoke, means for distributing smoke in passage through the housing, a plate interposed between the distributing means and said outlet and extending over the latter for regulating flow of the smoke through the former, and means for adjusting said plate.

17. In a smoke house, the combination with a housing, of means for producing smoke, said housing being provided with an outlet for the smoke, means for controlling passage of the smoke through the housing, a deflector plate interposed between the controlling means and said outlet and extending over the latter for regulating flow of the smoke, suspension devices for supporting said deflector plate, and means for adjusting said suspension devices to vary the position of the deflector plate with respect to said outlet.

18. In a smoke house, the combination with a housing, of means for producing smoke, said housing being provided with an outlet for the smoke, means for controlling passage of the smoke through the housing, a deflector plate interposed between the controlling means and said outlet and extending over the latter for regulating flow of the smoke, a plurality of bolts on which said deflector is suspended, and adjusting wheels associated with said bolts for adjusting the latter to vary the position of the deflector plate with respect to said outlet.

19. In a smoke house, the combination with a housing, of means for producing smoke, said housing being provided at its top with an outlet for the smoke, means adjacent to the top of said housing for controlling passage of the smoke through the latter, a deflector plate interposed between the controlling means and said outlet and extending over the latter for regulating flow of the smoke, a plurality of bolts depending from and projecting through said housing, said bolts serving to suspend said deflector from the top of the housing, and adjusting wheels connected to the projecting ends of said bolts at the exterior of the housing for adjusting the bolts to vary the position of the deflector with respect to said outlet.

20. In a smoke house, the combination of walls providing a housing, a plurality of smoke generating devices distributed across the area of the housing, means affording a plurality of apertures at the top of the housing to afford outlets distributed across the area thereof, and means for varying the effective area of said outlets.

21. In a smoke house, the combination of walls providing a housing, a plurality of smoke generating devices distributed across the area of the housing, means affording a plurality of apertures at the top of the housing to afford outlets distributed across the area thereof, and means operable from the exterior of the housing for varying the effective area of said outlets.

22. In a smoke house, a combination including a housing affording a confining chamber, a plurality of burners distributed across the area of said chamber in the lower part thereof, means for holding smoke producing material operatively associated with the burners and affording air passages distributed across the area of the chamber, and air conduits associated with the burners; said air conduits being arranged to discharge air in locations where it may be heated by the burners and rise through said air passages.

23. In a smoke house the combination of a housing affording a chamber, smoke generating means distributed within the lower portion of the housing and adapted to heat the interior thereof, means affording distributed outlet passages in the upper portion of the chamber, and means operable exteriorly of the housing while the same is closed for varying the effective area of said outlet passages.

24. In a smoke house, the combination of a housing affording a chamber, smoke generating means distributed across the area of the housing in its lower portion, discharge control means at the upper part of the housing affording a plurality of outlet apertures distributed throughout its area; said discharge control means and smoke generating means being operable exteriorly of the housing to control the density of the smoke therein.

25. In a smoke house, the combination of a housing affording a chamber, smoke generating and air heating means distributed across the area of the housing in its lower portion, discharge control means at the upper part of the housing affording a plurality of outlet apertures distributed throughout its area; said discharge control means, smoke generating means and air heating means being operable exteriorly of the housing to control the smoke density and temperature therein.

26. In a smoke house, a housing affording a chamber, a plurality of receptacles for smoke producing material distributed across the area of said chamber in its lower portion and affording intervening air passages, air introducing means associated with the several receptacles, and a burner coöperating with each of the said receptacles and its associated air introducing means to heat material in the former and air introduced by the latter.

27. A smoke house comprising the combination of a housing affording a chamber, smoke generating means disposed in the lower portion of said chamber, means for controlling inlet of air to said smoke generating means, a draft inducing outlet at the upper portion of the housing, means for varying the effectiveness of said draft outlet, and adjustable means disposed in the housing between the smoke generating means and the draft inducing outlet for distributing smoke throughout the area of the housing.

28. A smoke house comprising the combination of a housing affording a chamber, smoke generating means disposed in the lower portion of said chamber, means for controlling inlet of air to said smoke generating means, a draft inducing outlet at the upper portion of the housing, means for varying the effectiveness of said draft outlet, and flow control means between the smoke generating means and the outlet, said flow control means being operable exteriorly of the housing to vary the rate at which smoke may pass to the outlet.

29. In a smoke house, the combination comprising a housing affording a chamber, a plurality of burners distributed across the area of the chamber in its lower portion, a plurality of receptacles for smoke producing material associated with the burners severally and coöperating to segregate the burners from higher portions of the chamber and afford intervening air passages, and air introducing means arranged to discharge air within the chamber, about said receptacles and the burners.

In testimony whereof I have hereunto subscribed my name in the presence of two witnesses.

CARL W. KOEHLER.

Witnesses:
W. G. WEIL,
T. J. SHAUGHNESSY.